United States Patent
Chassignet et al.

(10) Patent No.: US 9,355,749 B2
(45) Date of Patent: May 31, 2016

(54) DEVICE FOR THE DRY HANDLING OF NUCLEAR FUEL ASSEMBLIES

(75) Inventors: Mathieu Jean Maurice Chassignet, Lyons (FR); Frederic Jean-Marie Schermesser, Caluire (FR)

(73) Assignee: AREVA NP, Courbevoie (FR)

( * ) Notice: Subject to any disclaimer, the term of this patent is extended or adjusted under 35 U.S.C. 154(b) by 333 days.

(21) Appl. No.: 13/822,561

(22) PCT Filed: Sep. 14, 2011

(86) PCT No.: PCT/FR2011/052095
§ 371 (c)(1),
(2), (4) Date: Mar. 12, 2013

(87) PCT Pub. No.: WO2012/035255
PCT Pub. Date: Mar. 22, 2012

(65) Prior Publication Data
US 2013/0177124 A1    Jul. 11, 2013

(30) Foreign Application Priority Data
Sep. 15, 2010  (FR) .................................... 10 57356

(51) Int. Cl.
*G21C 19/19*  (2006.01)
*G21C 19/10*  (2006.01)
*G21C 19/105* (2006.01)
*G21C 19/18*  (2006.01)
*G21C 19/32*  (2006.01)

(52) U.S. Cl.
CPC .............. *G21C 19/10* (2013.01); *G21C 19/105* (2013.01); *G21C 19/18* (2013.01); *G21C 19/19* (2013.01); *G21C 19/32* (2013.01)

(58) Field of Classification Search
CPC ...... G21C 19/10; G21C 19/32; G21C 19/105; G21C 19/18; G21C 19/19
USPC ................. 376/261, 264, 268, 269, 271, 272; 251/192, 193, 195, 212
See application file for complete search history.

(56) References Cited

U.S. PATENT DOCUMENTS

| 3,125,232 | A | * | 3/1964  | Brinkman | 376/260 |
| 3,383,286 | A | * | 5/1968  | Paget    | 376/269 |
| 4,064,000 | A | * | 12/1977 | Andrea   | 376/271 |
| 4,069,099 | A |   | 1/1978  | Wade     |         |

(Continued)

FOREIGN PATENT DOCUMENTS

| CN | 101850545    |    | 10/2010 |
| EP | 2617040 B1   | *  | 5/2015  |

(Continued)

OTHER PUBLICATIONS

International Search Report of corresponding International Application PCT/FR/2011/052095.

*Primary Examiner* — Jack W Keith
*Assistant Examiner* — Daniel Wasil
(74) *Attorney, Agent, or Firm* — Davidson, Davidson & Kappel, LLC

(57) ABSTRACT

A device for the dry handling of nuclear fuel assemblies is provided. The device includes a transfer basket which can be connected to a lifter and which includes a gripper for gripping the fuel assembly to be transferred, the gripper being supported by a lift built into the basket; and an indexing table which can be placed on a cask and which comprises a positioner for positioning the basket over a slot in the cask.

14 Claims, 9 Drawing Sheets

(56) References Cited

U.S. PATENT DOCUMENTS

| | | | |
|---|---|---|---|
| 4,113,558 A | | 9/1978 | Wade |
| 4,181,572 A | * | 1/1980 | Wade .............................. 376/206 |
| 4,452,278 A | * | 6/1984 | Quinn .............................. 138/44 |
| 4,460,536 A | * | 7/1984 | Krieger .......................... 376/268 |
| 4,649,016 A | * | 3/1987 | Hardin .......................... 376/261 |
| 4,800,062 A | * | 1/1989 | Craig et al. .................... 376/272 |
| 5,633,904 A | | 5/1997 | Gilligan, III et al. |
| 6,158,718 A | * | 12/2000 | Lang et al. .................... 251/195 |
| 2003/0194042 A1 | | 10/2003 | Singh et al. |
| 2010/0284778 A1 | | 11/2010 | Wegeler et al. |

FOREIGN PATENT DOCUMENTS

| | | |
|---|---|---|
| FR | 2 342 920 A1 | 9/1977 |
| FR | 2 582 438 A1 | 11/1986 |
| WO | WO2009081078 | 7/2009 |

\* cited by examiner

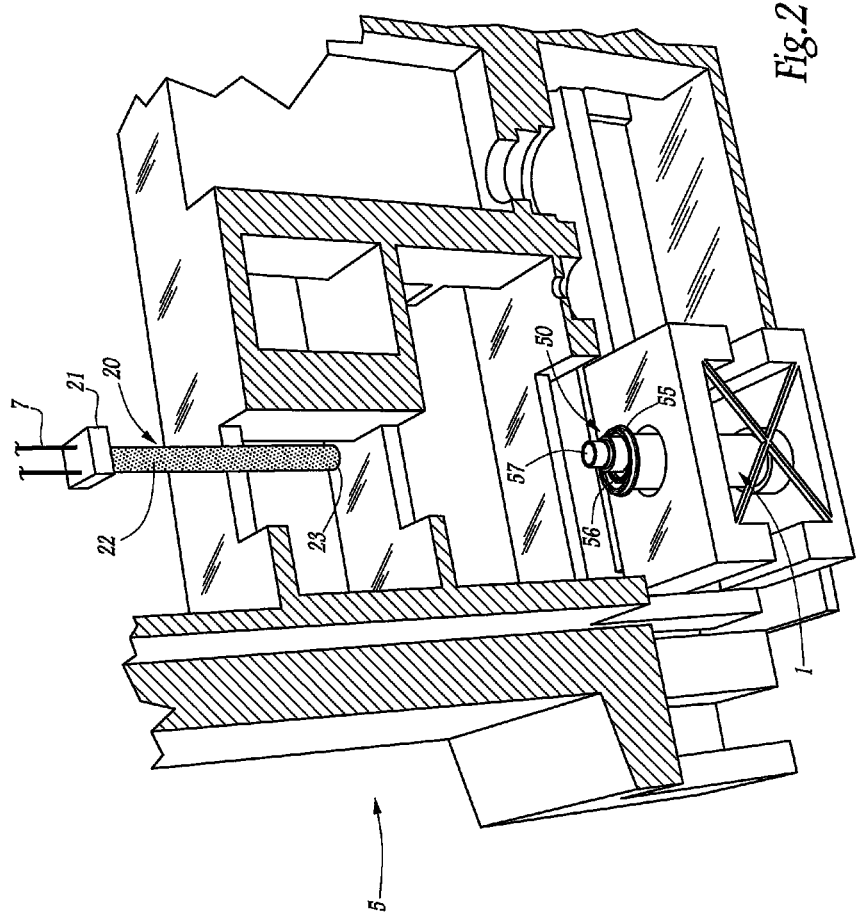

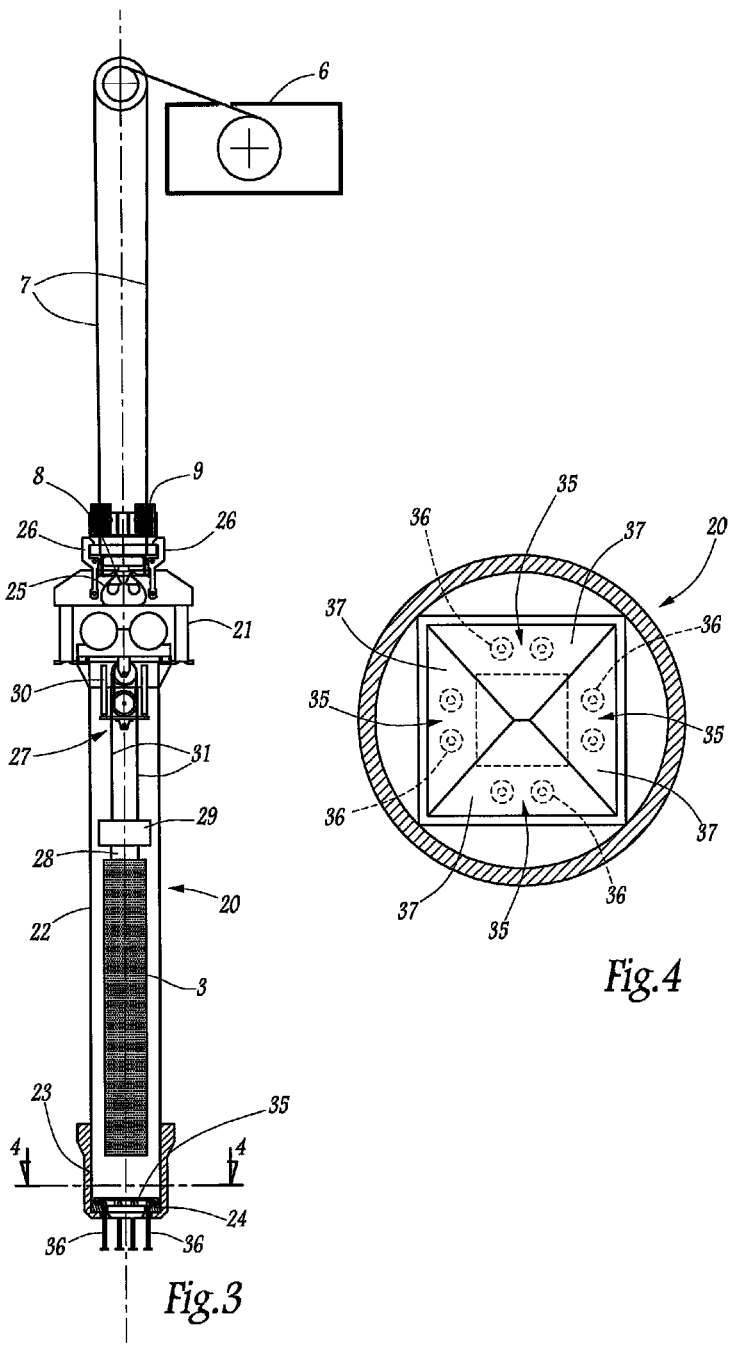

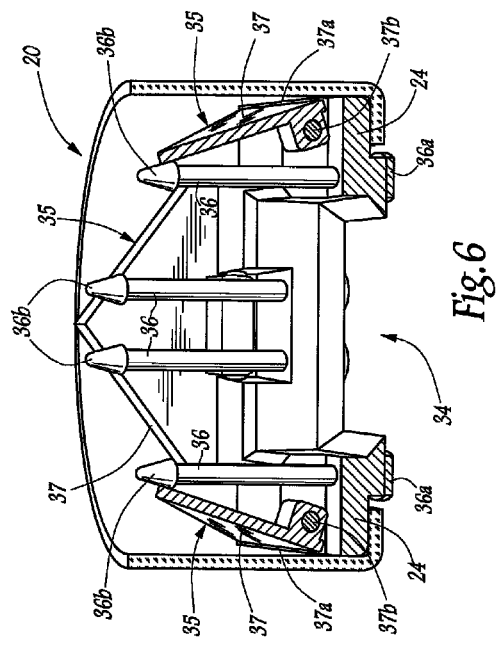
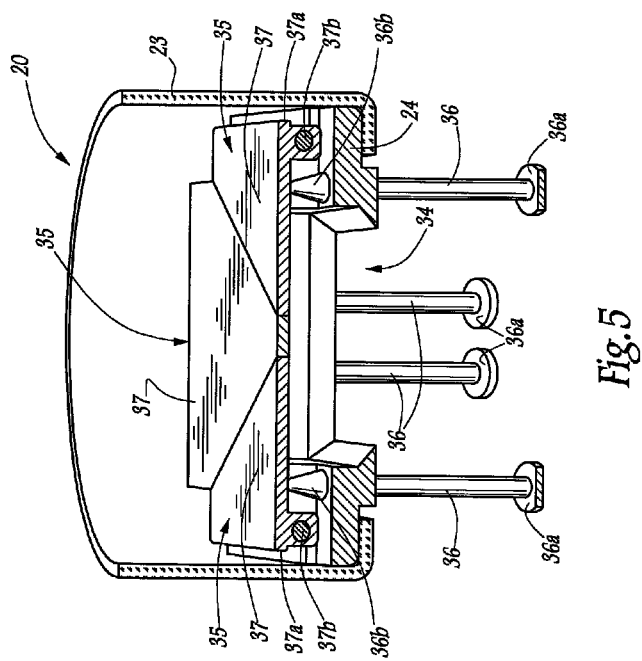
Fig. 5
Fig. 6

DEVICE FOR THE DRY HANDLING OF NUCLEAR FUEL ASSEMBLIES

The present invention relates to a device for the dry handling of nuclear fuel assemblies.

The invention also relates to the unloading of nuclear fuel assemblies stored in slots in a cask, as well as the dry loading of nuclear fuel assemblies in the slots of a cask.

BACKGROUND

The nuclear fuel assemblies are formed by assembling rods with a small diameter relative to their length. These rods, of which there are 200 to 300 per assembly, are formed by sheaths filled with nuclear fuel pellets, for example MOX.

These assemblies have a rectangular section of several tens of centimeters per side and measure several meters long.

Each nuclear reactor must be stopped periodically to replace some of the spent fuel assemblies with new fuel assemblies.

The new fuel assemblies are generally made in a pellet manufacturing plant and must be transported to the nuclear plants, where they will be placed in a storage facility before being transferred into the reactors.

The transport of these assemblies between the production plant and the nuclear power plant is done using a cask that includes slots in each of which a new fuel assembly is placed.

Upon arrival at the nuclear power plant, the new fuel assemblies are unloaded from the cask and brought into the storage facility made up of a storage pool, situated near the core of the reactor and in most cases at a level higher than the arrival level of the casks of the assemblies.

The first method for checking the reactivity of a fuel element is its geometry. The handling of a fuel assembly must therefore meet high reliability criteria and in particular show that the consequences of a fall of an assembly are acceptable and do not cause critical accidents or serious environmental consequences.

To date, when the fuel assemblies are transferred from a cask, that cask is moved and brought close to the pool and each assembly is removed from the cask and placed in a pool. This lifting operation of the cask close to the pool then makes it possible to limit the potential fall height of the assembly. The transfer is done either underwater or dry.

In the case of an underwater transfer, the cask is removed from the transport vehicle by suitable lifting means, for example such as a handling crane, and brought into a pool, or an unloading station, attached the storage pool. The related pool is then filled with water, then each fuel assembly is removed from its slot using lifting means and placed in the storage pool. The movement of the fuel assemblies is done underwater, thereby providing suitable biological protection for the operators.

This underwater fuel transfer nevertheless has a drawback, since it is next necessary to decontaminate the cask, and that decontamination operation exposes operators to doses of reactivity.

In the case of a dry transfer, as for example described in FR 2 260 169, the cask is removed from the transport vehicle by a lifting carriage supported by a bridge crane, then deposited in an area designed for storage thereof. Next, the fuel assembly is removed from the transport carriage and hoisted in an armored handling container suspended from the lifting carriage and then transported in the pool. Lifting means, for example such as a winch and a gripping handle fastened to the free end of a chain of the winch, make it possible to hoist the fuel assembly inside the handling container. The fuel assembly is also transferred into an inspection area before being placed in the pool.

All of these operations are time-consuming and require human interventions that risk subjecting operators to critical doses.

Furthermore, it is necessary each time to be able to hoist the cask to the level of the storage pool, which involves constraints on the installation of the receiving building and fall risks for the cask during these operations.

Furthermore, the handling container described in the dry unloading device mentioned above does not, however, have every safety guarantee in the event the fuel assembly falls due to the fact that it does not include closing elements at its base, but rather only means for gripping the fuel assembly in the container.

To that end, handling containers or transfer baskets are known that include closing elements at the base and primarily used to unload spent fuel assemblies from a storage area to store them in containers intended to be transported to another location. The closing element is in particular formed by a sliding or pivoting door actuated remotely. This solution is complex to implement due to the fact that it requires an entire mechanism for actuating the sliding or pivoting door.

SUMMARY OF THE INVENTION

An object of the invention is to provide a device for the dry handling of fuel assemblies that avoids these drawbacks, is easy to implement, and is adaptable on new or existing installations, while having all of the safety guarantees inherent to the handling of nuclear fuel assemblies.

A device for the dry handling of nuclear fuel assemblies is provided. The device includes
  a transfer basket which can be connected to lifting means and having an inner member for gripping the fuel assembly to be transferred on the one hand, supported by a lifting mechanism built into the basket, and a bottom provided with valves pivoting between an open position for the passage of the fuel assembly to be transferred and a closed position of the basket, on the other hand, and
  an indexing table which can be placed on a cask and including means for positioning the basket on a slot of said cask and orienting the gripping member supported by said basket relative to said fuel assembly.
 of the invention may include one or more of the following features:
  the basket comprises an upper portion including a double attachment system with a hook for a handling assembly, a body containing the built-in lifting mechanism bearing the gripping member and a lower portion formed by the bottom provided with said valves,
  the bottom of the basket includes a central opening for the passage of the gripping member and the fuel assembly in the open position of the valves,
  each valve is placed above the bottom and is associated with at least one movement element between said open and closed positions,
  said at least one movement element is formed by at least one pin sliding in the bottom and including a first end situated below the bottom and a second end bearing against the corresponding valve,
  the valves have mutually complementary shapes to cover the central opening in the closed position of said valves,
  each valve is formed by a triangular plate whereof the base is hingedly mounted on the bottom, the lifting mechanism built into the basket comprises a carriage movable by sliding of the basket in the body by means of a handling assembly, the device includes, between the indexing table and the cask, an adaptor part whereof the inner surface has a profile conjugated to the peripheral edge of the cask and the outer face of which is adapted to the standard dimensions of the indexing table, the indexing table comprises a peripheral support piece placed on the adaptor piece, a first stopper rotating inside the support piece, a second stopper rotating inside the first rotating stopper, and a third stopper rotating on the second stopper and forming a carrier for receiving the basket, the second and third stoppers communicating with the inside of the cask by an opening, the axis of the first stopper corresponds to the axis of the cask, the axis of the third stopper corresponds to the axis of the most extreme slot in the cask, and the axis of the second stopper is situated at an equal distance from the axes of the other two stoppers, the bottom of the third stopper includes, around the opening, a bearing rim for the first end of each movement element, and the second stopper includes, below the third stopper, a sleeve including an axial passage communicating with the openings of those stoppers, the axial passage determining an inspection area of the fuel assembly to be transferred and being provided with display and lighting means.

BRIEF SUMMARY OF THE DRAWINGS

Other features and advantages of the invention will emerge in the detailed description thereof provided below, for information and non-limitingly, in reference to the appended figures, in which:

FIG. 2 is a diagrammatic perspective view of a device for the dry handling of the fuel assembly in the cask, according to the invention, FIG. 3 is a diagrammatic axial cross-sectional view of a transfer basket for the fuel assemblies of the unloading device according to the invention, FIG. 4 is a cross-sectional view along line 4-4 of FIG. 3, FIGS. 5 and 6 are diagrammatic perspective and vertical cross-sectional half-views of the lower portion of the basket with the valves respectively in the closed position and the open position.

DETAILED DESCRIPTION

The description that follows will be provided as an example in the context of a use of the handling device to unload new fuel assemblies from a cask.

Figure 1:
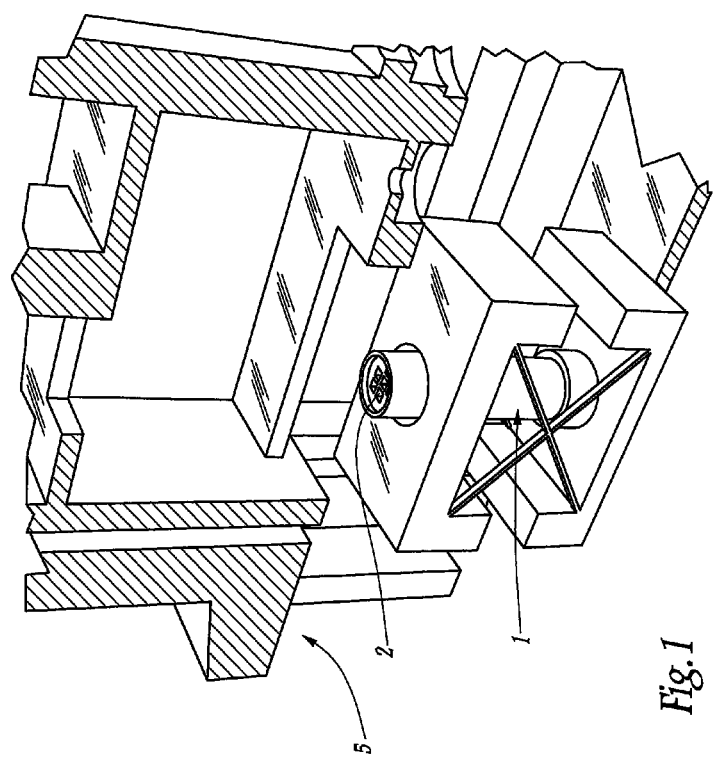
FIG. 1 is a diagrammatic perspective view of a cask for transporting new fuel assemblies in a building housing a nuclear power plant.

The new fuel assemblies are transported between a manufacturing plant and a nuclear power plant by a road or rail vehicle in an armored cask 1, diagrammatically shown in FIG. 1.

The transport cask 1 includes slots 2, in each of which new fuel assembly 3 is placed (shown in FIG. 3).

Figure 12:
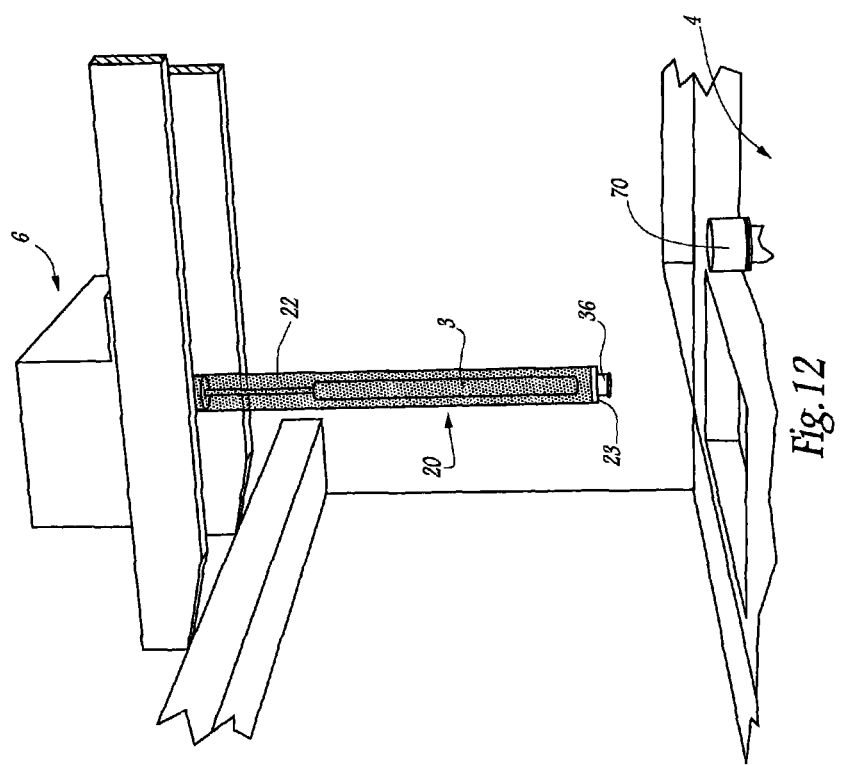

In the nuclear power plant, the new fuel assemblies 3 are brought toward the packaging and storage installations and stored in a storage pool 4 (FIG. 12).

To transfer the new fuel assemblies 3 from the cask 1 to the storage pool 4, said cask 1 is brought into a building 5 that includes a bridge crane 6 (FIG. 12) and in which the pool 4 is arranged.

The transfer of each fuel assembly 3 is done using a dry unloading device shown in FIG. 2.

This unloading device is made up of two primary elements, i.e.:

a transfer basket 20 that can be connected to a lifter, for example the bridge crane 6, and an indexing table 50 that can be placed on the cask 1.

The transfer basket 20 will now be described in reference to FIGS. 3 to 7.

The basket 20 comprises an upper portion 21 for attaching to the bridge crane 6 including a hook 8 connected by chains or cables 7 to the bridge crane 6, a body 22 forming a sheath for receiving the fuel assembly 3 during the transfer thereof, and a lower portion 23 including a bottom 24 that will be described later.

The upper portion 21 comprises a double attachment system made up of a member 25 for fastening on the hook 8 and claws 26 for fastening on the support 9 of that hook 8.

The body 22 of the basket 20 is inwardly provided with a built-in lifting mechanism 27 bearing a gripping member 28 for the fuel assembly 3.

Figure 7:
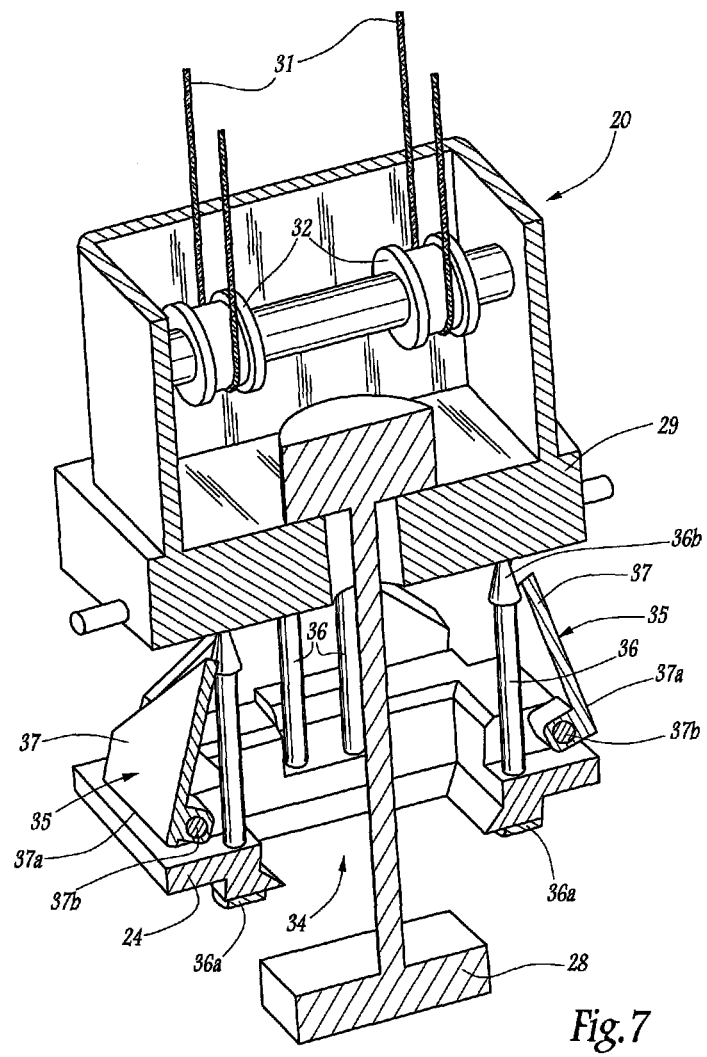
FIG. 7 is a diagrammatic perspective and vertical cross-sectional half-view of the lower portion of the basket with the gripping member of the fuel assembly to be transferred supported by a lifting mechanism built into the basket.

As shown in FIG. 7, the built-in lifting mechanism 27 comprises a carriage 29 bearing the gripping member formed for example by a grab 28 of a known type, the carriage 29 being guided and moved by sliding in the body 22 by a handling assembly for example comprising a winch 30 provided with chains 31 cooperating with pulleys 32 supported by the carriage 29.

As shown in FIGS. 3 and 7, the assembly of the lifting mechanism 27, i.e., the carriage 29, the winch 30, the chains 31 and the pulleys 32, is built into the body 22 of the basket 20, which prevents any communication with the outside of said basket.

The lifting mechanism 27 is dedicated to lifting and lowering the fuel assembly 3 to be transferred and is distinct from the bridge crane 6 generally used for handling heavier objects. The lifting mechanism 27 built in the basket for example has a lifting capacity of approximately 1 ton whereas the bridge crane 6 has a lifting capacity of approximately 20 tons. The mechanism 27 therefore has much greater precision than the bridge crane.

As appears in FIGS. 4 to 6, the bottom 24 of the lower portion 23 of the basket 20 is provided with valves 35 pivoting between an open position (FIG. 6) for the passage of the fuel assembly 3 to be transferred and a closed position (FIG. 5) of the body 22 of the basket 20. This bottom 24 has a central opening 34 for the passage of the gripping member 28 and the fuel assembly 3 when the valves 35 are in the open position, as shown in FIG. 6.

In the example embodiment illustrated in FIGS. 4 to 6, each valve 35 is placed above the bottom 24 and associated with at least one movement element 36 between the open and closed positions. Each movement element is formed by a pin 36 sliding in the bottom 24 and including a first end 36a situated below the bottom 24 and a second end 36b bearing against the corresponding valve 35.

As more particularly shown in FIGS. 4 to 6, the valves 35 have a complementary shape to cover the central opening 34 in the closed position of said valves 35 and each valve 35 is formed by a triangular plate 37 whereof the base 37a is hingedly mounted by means of an axle 37b on the bottom 24 of the basket 20.

The valves 35 close automatically by gravitational return to work under the effect of a torsion spring arranged on the shaft 37b of each plate 37.

It will be noted that the example embodiment illustrated in the figures is only one example among others of an automatic closing system of the basket using valves. The valves may have a different shape, for example rectangular. There may be two or more of them. They do not necessarily have complementary shapes, they may also be arranged so as to be superimposed on one another when they close or so as not to join perfectly with each other. However, the valves must rest directly or by means of an intermediate piece on a surface of the basket, for example on the bottom 24, to ensure reaction of the load in case of an assembly falls in the basket. Likewise, the movement elements of the valves may have a shape other than the pins 36 and they may be more or less numerous. The pins may in particular be connected to each other on the side of their first end 36a so as only to form a single piece.

The transfer basket 20 provides the fuel assembly 3, during transport thereof, with mechanical protection against lateral impacts and makes it possible to withstand the potential fall of the fuel assembly and limit the possible fall height when the base of the basket 20 is closed by the valves 35. This basket 20 also makes it possible to orient the grab 28, as will be described later.

The indexing table 50 will now be described in reference to FIG. 8 in particular.

The purpose of this indexing table 50 is to adapt to the different casks and position the basket 20 directly across from the slot 2 corresponding to the fuel assembly 3 to be transferred, to support that basket 20 during the lifting operations of the fuel assembly 3, and to allow inspection of that fuel assembly 3 when it leaves the casks 1.

To that end, an adaptor piece 51 is inserted between the indexing table 50 and the casks 1, and said adaptor piece 51 has an interface having a profile conjugated with the peripheral edge of the cask and an outer face adapted to the standard dimensions of the indexing table 50.

Figure 8:
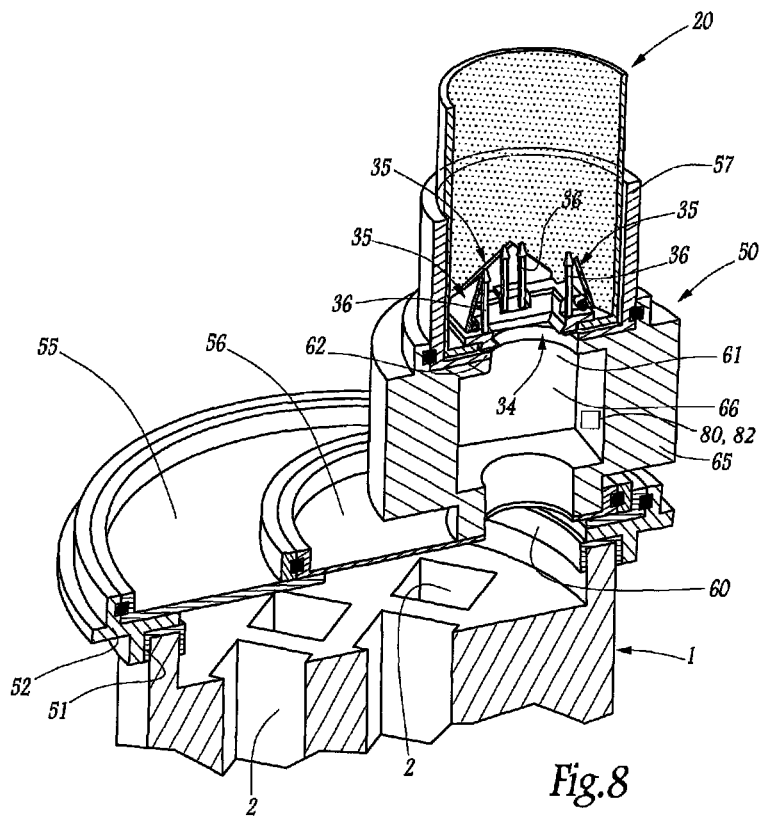
FIG. 8 is a diagrammatic perspective and vertical cross-sectional half-view of an indexing table of the unloading device, according to the invention.

In the example embodiment shown in FIG. 8, this adaptor piece 51 has a transverse section in the shape of an inverted U. The sealing between the adaptor piece 51 and the peripheral edge of the cask is for example ensured by two O-rings or by any other suitable member.

The correct positioning of the basket 20 across from the proper slot 2 containing the fuel assembly 3 to be transferred is done by the indexing table 50, which includes:
  a first stopper 55 rotating inside a support piece 52,
  a second supper 56 rotating inside a first stopper 55, and
  a third stopper 57 rotating on the second stopper 56.

The support piece 52 provides the interface with the adaptor piece 51 and is therefore stationary relative to the cask 1. The stoppers 55, 56 and 57 may for example be supported by ball bearings guided by rails, for example made from steel, or any other suitable system of a known type, ensuring proper positioning of the basket 20 and also ensuring reaction of the weight of the assembly formed by the basket 20 with the built-in lifting mechanism and also the fuel assembly 3 to be transferred. The sealing between each stopper is ensured by a set of two O-rings or by any other suitable sealing member.

Figure 9:
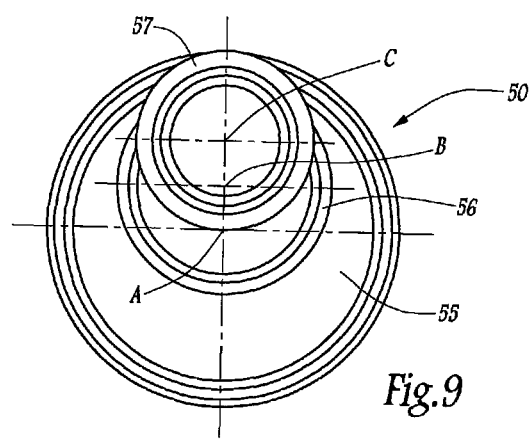
FIG. 9 is a diagrammatic top view of the indexing table.

Thus, as shown in FIG. 9, the axis A of the first stopper 55 corresponds to the axis of the cask 1, the axis C of the third stopper 57 corresponds to the axis of the outermost slot 2 in the cask 1, and the axis B of the second stopper 56 is situated at an equal distance between the axes A and C of the other two stoppers 55 and 57. In this way, the basket 20 can be placed in all of the positions of the slots 2 of the cask 1.

The second stopper 56 communicates with the inside of the cask 1 by an opening 60 and the third stopper 57 communicates with the inside of the cask 1 by an opening 61, the openings 60 and 61 being coaxial.

As shown in FIG. 8, the third stopper 57 forms a carrier for receiving the basket 20 and includes conical steps in its upper portion, making it possible to guide the basket 20 during its positioning in the third stopper 57. When the basket 20 is alongside the third stopper 57, that basket 20 is rotatably connected with the third stopper 57, either by its own weight, or by a temporary connecting device of a known type. The rotation of the third stopper 57 makes it possible to rotate the basket 20 by an angle of approximately 45° so that the grab 28 is properly aligned with the fuel assembly 3 to be transferred.

To allow opening of the valves 35, the bottom of the third stopper 57 includes, around the opening 61, a bearing rim 62 for the first end 36a of each pin 36. The basket 20 is provided with a set of O-rings in the lower portion to maintain the confinement of the cask 1.

As shown in FIG. 8, the second stopper 56 includes, below the third stopper 57, a sleeve 65 including an axial passage 66 communicating with the openings 60 and 61 of those stoppers 56 and 57, respectively. The axial passage 66 determines an inspection area of the fuel assembly 3 to be transferred and that area is equipped with a display 80, such as cameras and lighting 82, for example which are schematically shown. Several cameras can be installed at a same level. The rotation of the second stopper 56 makes it possible to view the periphery of the fuel assembly 3 during its transfer.

The new fuel assemblies 3 are unloaded as follows.

The cask 1 containing the new fuel assemblies 3 is brought by its own transport vehicle into the building 5 of the nuclear power plant.

The operators proceed to prepare the cask 1 and the fuel assemblies 3 for unloading.

Figure 10:
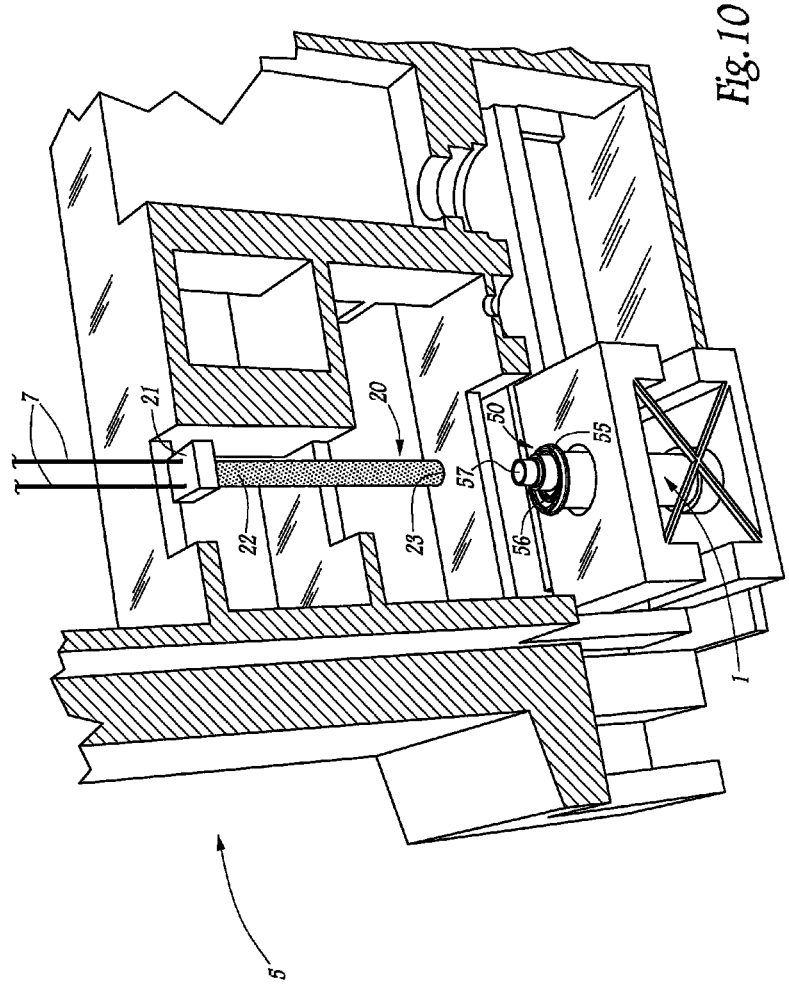
FIGS. 10 to 13 are diagrammatic perspective views showing the different steps of transshipment of a fuel assembly using the handling device according to the invention.

First, the adaptor piece 51 adapted to the cask 1 is placed thereon and the assembly of the indexing table 50 including the support piece 52 and the stoppers 55, 56 and 57, respectively, is placed on the adaptor piece 51, as shown in FIG. 10.

The stoppers 55 and 56 are rotated to place the openings 60 and 61 in the axis of the slot 2 containing the fuel assembly 3 to be transferred.

Figure 11:
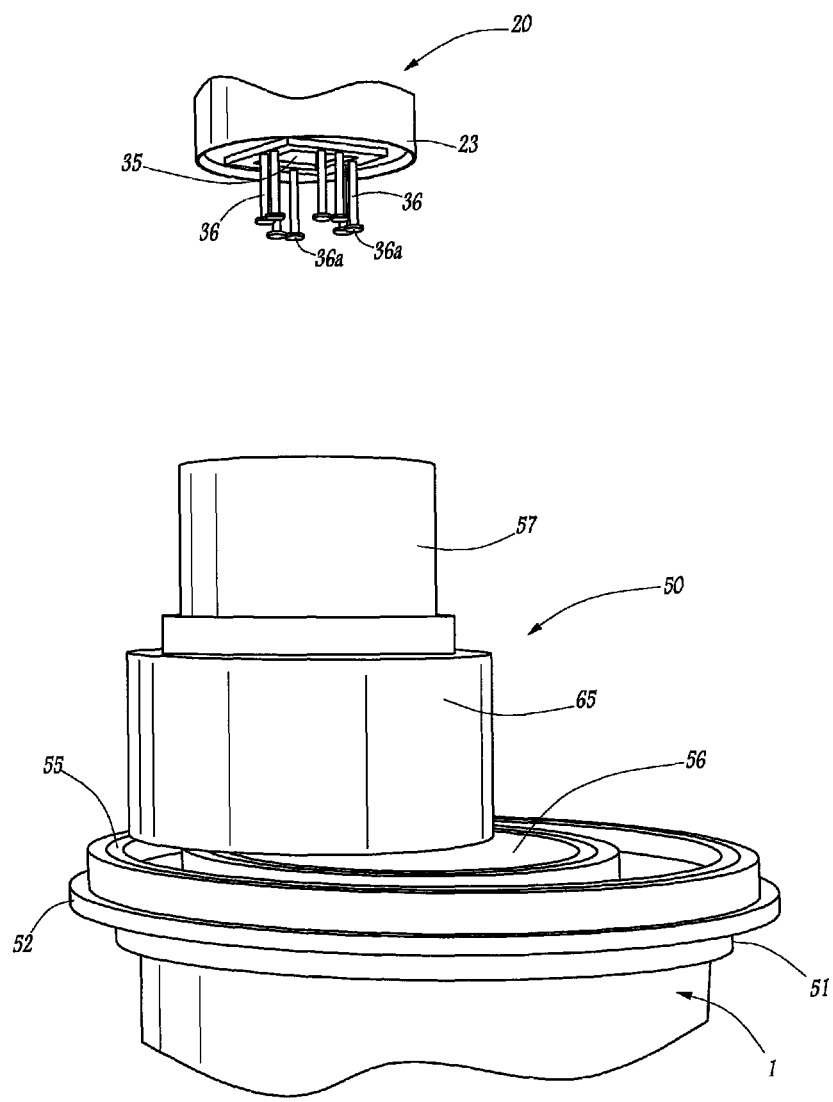

Then, the basket 20 is brought by the bridge crane 6 above the third stopper 57, as shown in FIGS. 10 and 11.

During the movement of the basket 20, the valves 35 are in the closed position and the end 36a of the pins 36 protrude below the bottom 24 of the basket 20.

This basket 20 is gradually lowered into the third stopper 57 so as to bring the ends 36a of the pins 36 into contact with the bearing rim 62 formed around the opening 61 of that third stopper 57.

The end 36a of the pins 36 come into contact with the bearing rim 62 and the pins 36 with the valves 35, as shown in FIGS. 6 and 8, so as to put the inside of the basket 20 in communication with the slot 2 containing the fuel assembly 3 to be transferred.

The third stopper 57 is rotated to pivot the basket 20 and thereby orient the grab 28 in the appropriate position to grasp the fuel assembly 3.

This fuel assembly 3 is gripped by the grab 28 and gradually lifted by the chains 31 driven by the winch 30. In the event the fuel assembly falls into the cask 1, the static confinement is provided by the indexing table 50 and the basket 20.

The lifting chains 31 are suitable for handling fuel assemblies and have a high level of reliability and are in particular equipped with overload and excess speed detectors.

During its passage in the area 66 delimited by the sleeve 65, the fuel assembly 3 undergoes a visual inspection, which avoids the need to transport that fuel assembly 3 into a specific inspection room.

The fuel assembly 3 is gradually brought to the inside of the basket 20 and once it is placed therein, the lifting means of the bridge crane 6 lift the basket 20, which moves away from the bottom 62 of the third stopper 57. Once the basket 20 moves away from that bottom 62, the valves 35 close, thereby ensuring confinement of the fuel assembly 3 in the basket 20. This basket 20 provides protection against any lateral impacts and limits the height of a potential fall of the fuel assembly 3 when the latter is in said basket, as shown in FIG. 12.

The basket 20 containing the fuel assembly 3 is horizontally movable by the bridge crane 6 and brought toward the packaging and storage installations for new assemblies, then into the storage pool 4.

Figure 13:
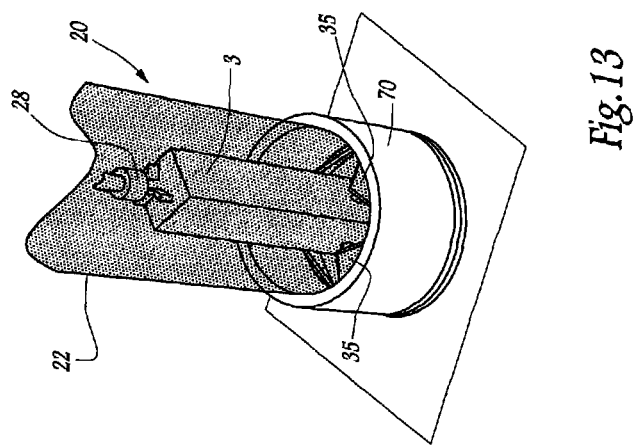

As shown in FIGS. 12 and 13, this pool 4 is equipped with a carrier 70 for receiving the lower portion of the basket 20 that includes, identically to the third stopper 57, a bearing surface for the end 36a of the pistons 36 so as to allow opening of the valves 35 when the basket 20 is placed in the carrier 70. The bottom of this carrier 70 is also provided with an opening to allow the passage of the fuel assembly 3 to be deposited in the pool 4. This fuel assembly 3 is gradually lowered into the pool 4 using the grab 28, the chains 31 and the winch 30 of the basket 20.

The new fuel assembly 3 is then deposited in the storage pool 4.

The device for the dry handling of new fuel assemblies makes it possible to limit the risks of defect or deterioration of those assemblies by using, dedicated handling equipment offering mechanical protection during handling on the one hand, and by not needing to lift the cask under any circumstances on the other hand.

The reliability of the lifting is further increased by having a transport basket handled by a crane whereof the maximum load is much larger than the weight of the cask and having a redundant attachment between the basket and the crane.

The handling device according to the invention also has the advantage of limiting the consequences of any fall of the fuel assembly either by limiting the height of the possible falls, or by providing additional static confinement in certain parts of the unloading steps. The basket also protects the fuel assembly against the lateral impacts that may occur during the handling phase.

The device according to the invention may of course also adapt to a new installation as well as an existing installation, given that it involves little or no modification to the existing material and makes it possible to limit the dose rates for operators due to the fact that the unloading is done dry, which avoids having to decontaminate the cask and limits the needs for human intervention.

Although the device for the dry handling of nuclear fuel assemblies described above is particularly well suited to unloading new fuels containing MOX, it may advantageously also be used to handle spent fuel, in particular when spent fuel assemblies must be transported into fuel re-treatment plants using a cask.

What is claimed is:

1. A device for the dry handling of nuclear fuel assemblies comprising:
a fuel assembly transfer basket connectable to a lifter and having an inner gripper structurally configured for gripping a fuel assembly to be transferred, the inner gripper supported by a fuel assembly lift entirely contained inside the basket with no communication outside of the basket, the transfer basket including a bottom comprising a bottom opening, the bottom being provided with valves pivoting between an open position of the basket, which allows passage of the fuel assembly through the bottom opening, and a closed position of the basket, which prevents passage of the fuel assembly through the bottom opening; and
an indexing table placeable on a cask, the cask having slots configured to hold nuclear fuel assemblies, the indexing table having a carrier for receiving the basket in a position in which the basket stands on the indexing table above the cask, the indexing table including a positioner for positioning the carrier on one of the slots of the cask, the indexing table being configured to rotate the basket with respect to the cask for orienting the inner gripper relative to the fuel assembly held in the slot.

2. The device as recited in claim 1 wherein the basket comprises an upper portion including a double attachment system with a hook for the lifter, a body containing the built-in lift bearing the inner gripper and a lower portion formed by the bottom provided with the valves.

3. The device as recited in claim 1 wherein the bottom of the basket includes a central opening for the passage of the inner gripper and the fuel assembly in the open position of the valves.

4. The device as recited in claim 3 wherein the valves have mutually complementary shapes to cover the central opening in the closed position of the valves.

5. The device as recited in claim 4 wherein each valve is formed by a triangular plate whereof the base is hingedly mounted on the bottom.

6. The device as recited in claim 1 wherein each valve is placed above the bottom and is associated with at least one movement element between the open and closed positions.

7. The device as recited in claim 6 wherein the at least one movement element is formed by at least one pin sliding in the bottom and including a first end situated below the bottom and a second end bearing against a corresponding one of the valves.

8. The device as recited in claim 1 wherein fuel assembly lift comprises a carriage movable by sliding in the body of the basket by a handling assembly.

9. The device as recited in claim 1 further comprising an adaptor between the indexing table and the cask, an inner surface of the adaptor having a profile conjugated to a peripheral edge of the cask and an outer face of which is adapted to the standard dimensions of the indexing table.

10. The device as recited in claim 9 wherein the indexing table comprises a peripheral support piece placed on the adaptor, a first stopper rotating inside the support piece, a second stopper rotating inside the first rotating stopper, and a third stopper rotating on the second stopper and forming a carrier for receiving the basket, the second and third stoppers communicating with the inside of the cask by an opening.

11. The device as recited in claim 10 wherein an axis of the first stopper corresponds to an axis of the cask, an axis of the third stopper corresponds to an axis of the outermost slot in the cask, and an axis of the second stopper is situated at an equal distance from the axes of the other first and third stoppers.

12. The device as recited in claim 10 wherein a bottom of the third stopper includes, around the opening, a bearing rim for a first end of each movement element.

13. The device as recited in claim 10 wherein the second stopper includes, below the third stopper, a sleeve including an axial passage communicating with the opening of the second and third stoppers, the axial passage determining an inspection area of the fuel assembly to be transferred and being provided with a display and lighting.

14. A method of dry unloading nuclear fuel assemblies comprising:
    providing a device for the dry handling of nuclear fuel assemblies comprising:
        a fuel assembly transfer basket connectable to a lifter and having an inner gripper structurally configured for gripping a fuel assembly to be transferred, the inner gripper supported by a fuel assembly lift entirely contained inside the basket with no communication outside of the basket, the transfer basket including a bottom comprising a bottom opening, the bottom being provided with valves pivoting between an open position of the basket, which allows passage of the fuel assembly through the bottom opening, and a closed position of the basket, which prevents passage of the fuel assembly through the bottom opening; and
        an indexing table placeable on a cask, the cask having slots configured to hold nuclear fuel assemblies, the indexing table having a carrier for receiving the basket in a position in which the basket stands on the indexing table above the cask, the indexing table including a positioner for positioning the carrier on one of the slots of the cask, the indexing table being configured to rotate the basket with respect to the cask for orienting the inner gripper relative to the fuel assembly held in the slot; and
    gripping the nuclear fuel assembly held in the slot from in the slot of the cask using the inner gripper and unloading the nuclear fuel assembly using the device for dry handling of nuclear fuel assemblies.

* * * * *